United States Patent
Shaffer et al.

(10) Patent No.: US 8,442,196 B1
(45) Date of Patent: *May 14, 2013

(54) APPARATUS AND METHOD FOR ALLOCATING CALL RESOURCES DURING A CONFERENCE CALL

(75) Inventors: Shmuel Shaffer, Palo Alto, CA (US); Shantanu Sarkar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/322,935

(22) Filed: Dec. 29, 2005

Related U.S. Application Data

(63) Continuation of application No. 09/766,424, filed on Jan. 18, 2001, now Pat. No. 7,003,086.

(51) Int. Cl.
*H04M 3/42* (2006.01)

(52) U.S. Cl.
USPC ................................. 379/202.01; 379/212.01

(58) Field of Classification Search ............. 379/202.01, 379/212.01; 370/16
See application file for complete search history.

(56) References Cited

U.S. PATENT DOCUMENTS

| 4,477,895 A | 10/1984 | Casper et al. ................. 370/228 |
| 5,467,342 A | 11/1995 | Logston et al. ............... 370/253 |
| 5,563,882 A | 10/1996 | Bruno et al. .................. 370/260 |
| 5,625,407 A | 4/1997 | Biggs et al. ................. 348/14.11 |
| 6,081,513 A * | 6/2000 | Roy .............................. 370/260 |
| 6,259,785 B1 | 7/2001 | Shaffer et al. ................. 379/265 |
| 6,275,575 B1 | 8/2001 | Wu ........................ 379/202.01 |
| 6,381,321 B1 * | 4/2002 | Brown et al. ............. 379/207.02 |
| 6,574,216 B1 * | 6/2003 | Farris et al. ................... 370/352 |
| 6,671,262 B1 * | 12/2003 | Kung et al. .................... 370/260 |
| 6,735,175 B1 | 5/2004 | Havens ........................ 370/236 |
| 2002/0006128 A1 | 1/2002 | Yehuda et al. ................ 370/390 |
| 2002/0170067 A1 | 11/2002 | Norstrom et al. ............. 725/109 |

* cited by examiner

*Primary Examiner* — Rasha Al Aubaidi
(74) *Attorney, Agent, or Firm* — Baker Botts L.L.P.

(57) ABSTRACT

A method and apparatus for allocating call resources during a conference call are disclosed. A conference call between a plurality of clients is conducted on a first conference call. The clients communicate media streams to the first conference call for mixing. A media gateway identifies a second call resource to conduct the conference call and mix the media streams, and transfers the conference call from the first call resource to the second call resource without suspending a plurality of mixed media streams received by the clients.

28 Claims, 3 Drawing Sheets

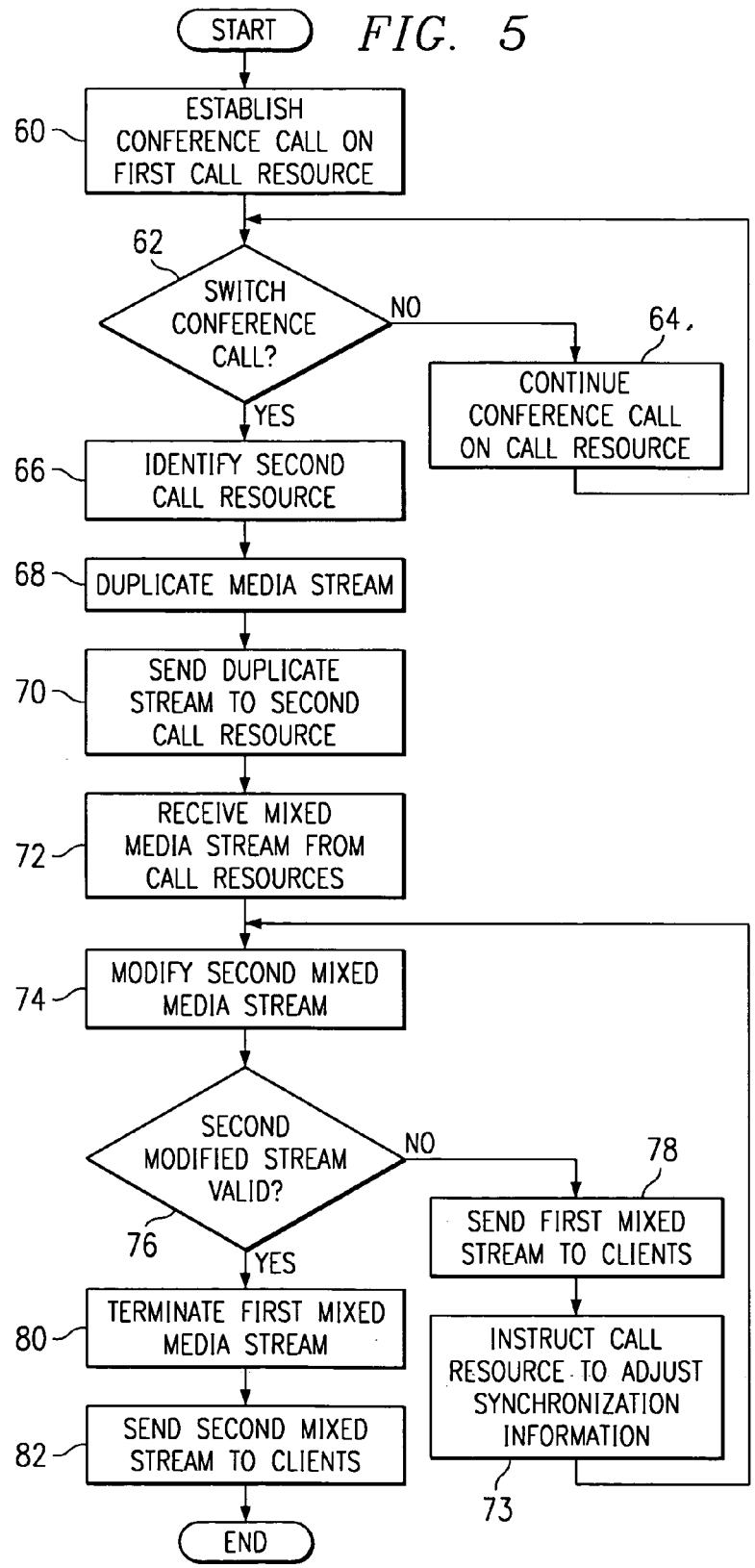

APPARATUS AND METHOD FOR ALLOCATING CALL RESOURCES DURING A CONFERENCE CALL

CROSS-REFERENCE TO RELATED APPLICATION

This application is a continuation of U.S. application Ser. No. 09/766,424 filed Jan. 18, 2001 now U.S. Pat. No. 7,003,086 and entitled "Apparatus and Method for Allocating Call Resources During a Conference Call".

TECHNICAL FIELD OF THE INVENTION

This invention relates in general to packet-based communication networks, and more particularly to an apparatus and method for allocating call resources during a conference call.

BACKGROUND OF THE INVENTION

Consumers in business continue to demand more sophisticated communication systems that allow increasing numbers of people to participate in a conference call using audio, video and other data. The conference call may be executed by processors, such as digital signal processors, which create, modify and terminate media streams communicated to the clients participating in the conference call. In conventional systems, each time a conference call is initiated, the processor is allocated to accommodate a conference call having a maximum number of participants. If the conference call has less than the maximum number of participants, the processor may be under-utilized if no additional participants join the conference call. Communication providers face a challenge to provide communication systems that efficiently utilize processors when multiple conference calls occur on a communication network.

SUMMARY OF THE INVENTION

In accordance with the teachings of the present invention, the disadvantages and problems associated with allocating call resources during a conference call have been substantially reduced or eliminated. In a particular embodiment, a method for allocating call resources during a conference call is disclosed that transfers the conference call from a first call resource to a second call resource without suspending mixed media streams communicated by a media gateway to clients participating in the conference call.

In accordance with one embodiment of the present invention, a method for allocating a plurality of call resources during a conference call includes conducting a conference call between a plurality of clients on a first call resource and identifying a second call resource available to conduct the conference call. The conference call includes a plurality of media streams communicated by the clients for mixing by the first and second call resources. The method also includes transferring the conference call from the first call resource to the second call resource without suspending a plurality of mixed media streams communicated received by the clients.

In accordance with another embodiment of the present invention, a communication system for allocating a plurality of call resources during a conference call includes a first call resource, a second call resource, a plurality of clients and a media gateway coupled to a packet-based network. The plurality of clients initiate and join the conference call on the first call resource by communicating a plurality of media streams. The first and second call resources couple to the network at different physical locations and receiving the media streams for mixing. The media gateway transfers the conference call from the first call resource to the second call resource without suspending a plurality of mixed media streams received by the clients.

In accordance with a further embodiment of the present invention, a media gateway for allocating a plurality of call resources during a conference call includes an interface for coupling to a communication network and for receiving media streams communicated by a plurality of clients participating in the conference call. A processing module couples to the interface and transfers the conference call from a first call resource to a second call resource without suspending a plurality of mixed media streams received by the clients. A storage medium couples to the processor and stores information associated with the mixed media streams.

Important technical advantages of certain embodiments of the present invention include a media gateway that transfers a conference call between call resources without notifying clients participating in the conference call that the conference call has been transferred to another call resource. When the conference call is transferred, the media gateway modifies the mixed media streams received from the new call resource to match the mixed media streams received from the original call resource. The transfer, therefore, is transparent to the clients because the media gateway ensures that the media streams communicated and received by the clients remain connected during the transfer.

Another important technical advantage of certain embodiments of the present invention includes a media gateway that directs media streams communicated by clients participating in a conference call to call resources distributed across a communication network. If the media gateway receives a request to initiate an additional conference call on the call resource, the media gateway determines if the additional conference call may be conducted on the call resource. If the number of participants in the original conference call changes, the media gateway determines which conference call may be transferred. The media gateway bases its determination on the number of participants that are in each conference call, the amount of time that each conference call has been in session, and the available call resources coupled to the network. The media gateway, therefore, eliminates or reduces under-utilization of the call resources if multiple conference calls are being conducted on the network.

Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which:

FIG. 5 illustrates a flow diagram of the steps for allocating call resources during the conference call.

DETAILED DESCRIPTION OF THE INVENTION

Figure 1:
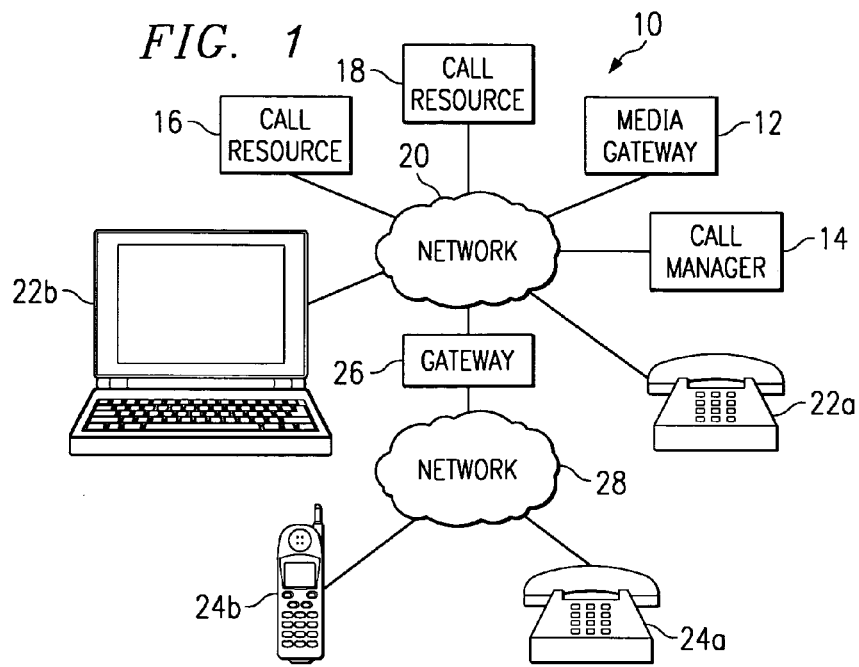
FIG. 1 illustrates a block diagram of a communication network that supports allocation of call resources during a conference call.

FIG. 1 illustrates a block diagram of a communication system 10 for allocating call resources 16 and 18 during a conference call. Although a specific communication network is illustrated in FIG. 1, the term "communication network" should be interpreted as generically defining any network capable of transmitting telecommunication signals, data and/or messages. In the illustrated embodiment, system 10 includes media gateway 12, call manager 14, call resources 16 and 18, and clients 22 and 24 coupled to network 20. System 10 further includes gateway 32 coupling network 20 in communication with network 30. Clients 26 and 28 couple to network 30 and communicate with clients 22 and 24 via gateway 32. In one embodiment, media gateway 12 may transfer a conference call being conducted on call resource 16 to call resource 18 without terminating the conference call between clients 22, 24, 26 and 28.

Network 20 may be a local area network (LAN), a wide area network (WAN), the Internet or other similar network that transmits packets of voice, video and data information. In a particular embodiment, network 20 may be an Internet Protocol (IP) network. However, network 20 may be any type of network that allows transmission of audio and video telecommunication signals, as well as traditional data communications. Therefore, although subsequent description will primarily focus on IP communications, it should be understood that other appropriate methods of transmitting voice, video and data over a network, such as a Frame Relay, Asynchronous Transfer Mode (ATM), or other packet-based network, are also included within the scope of the present invention.

Network 20 may be coupled to other IP networks and may communicate voice, video and data information between clients 22 and 24, and other clients located on different, but interconnected, IP networks. Network 20 may also be coupled to non-IP communication networks, such as network 30, through the use of gateway 32. For example, network 30 may be a private branch exchange (PBX), the public switched telephone network (PSTN) or a wireless network. Gateway 32 may digitize a telephone or data signal from network 30 if it is not already digitized, compress the digitized signal, and route it to a destination over network 20 in packet form. Gateway 32 may also convert packets of data into telephone or data signals that may be transmitted across network 30.

IP networks and other packet-based networks typically transmit data, including voice and video, by placing the data in packets and sending each packet individually to the selected destination. Unlike a circuit-switched network, such as the PSTN, dedicated bandwidth is not required for the duration of a conference call over network 20. Instead, clients 22 and 24, and gateway 32 may send packets across network 20 as network 20 becomes available for transmission. This feature makes bandwidth available for additional communications when voice, video or other data is not being transmitted from clients 22 and 24, and gateway 32.

The technology that allows telecommunications to be transmitted over a packet-based network may be referred to as Voice over Packet (VoP). Clients 22 and 24, and gateway 32 may have the capability to encapsulate a user's voice or other content into data packets so that the content may be transmitted over network 20. Clients 22, 24, 26 and 28 may, for example, include cordless or cellular telephones, personal digital assistants (PDAs), or other wireless devices. Also, clients 22, 24, 26 and 28 may include telephony software running on a computing device, traditional plain old telephone (POTS) devices, analog phones, digital phones, IP telephony devices, or other computing and/or communication devices that communicate audio, video or data content using analog and/or digital signals.

System 10 includes a call manager 14 that manages the overall establishment of conference calls. Call manager 14 is an application that controls call processing, routing, telephone features and options (such as call hold, call transfer, call waiting and caller ID), device configuration, and other functions and parameters within network 20. Call manager 14 may control one or more of clients 22 and 24, and gateway 32 coupled to network 20 and clients 26 and 28 coupled to network 30. Call manager 14 may also control clients located on other networks communicating with network 20. Call manager 14 may be implemented as hardware or as software executing on one or more computers coupled to network 20. The call manager software may be embodied in any type of computer-readable medium including, but not limited to, hard drives, diskettes, CD-ROMs, DVD-ROMs, or other optical or magnetic storage drives.

Call resources 16 and 18 couple to network 20 at different physical locations. For example, network 20 may be a WAN, and call resource 16 may couple to network 20 in San Jose, Calif. and call resource 18 may couple to network 20 in Austin, Tex. Call resources 16 and 18 include multiple media processors to exchange and mix media streams associated with clients 22, 24, 26 and 28 participating in a conference call over network 20. Each media processor may be operable to conduct at least one conference call. The media processors operate with digital signal processing (DSP) resources and perform encoding, transcoding, compressing, decompressing, decoding, mixing, and other signal processing functions to control the media streams in the conference call. Call resources 16 and 18 may support the G.711, G.723 and G.729 audio coding protocols.

In one embodiment, call resources 16 and 18 receive media streams from clients 22 and 24, and gateway 32, encode, decode, and/or transcode the media streams into a proper format using at least one of the media processors, and generate a number of mixed media streams for communication back to clients 22 and 24, and gateway 32. The media streams received by call resources 16 and 18 and the mixed media streams communicated by call resources 16 and 18 may be in the form of audio, video or data content encoded in packets, cells, or other portions or segments of information suitable for communication over network 20. Clients 22 and 24, and gateway 32 may receive the packets of information for presentation to conference participants.

In system 10, signaling to and from clients 22, 24, 26 and 28, and gateway 32 during a conference call is first passed through call manager 14. Signaling between clients 22, 24, 26, and 28, gateway 32 and call manager 14 may be performed using any appropriate signaling method, including, but not limited to, a direct signaling model, such as H.323, session initiation protocol (SIP) and media gateway control protocol (MGCP). Call manager 14 may provide signaling for the conference call and may instruct media gateway 12 to establish media streams and mixed media streams for clients 22 and 24, and gateway 32.

System 10 also includes media gateway 12 that directs media communicated by clients 22 and 24, and clients 26 and 28 through gateway 32 to available media processors in call resources 16 and 18. Media gateway 12 may be implemented as hardware or software executing on one or more computers coupled to network 20. The media gateway software may be embodied in any type of computer-readable medium including, but not limited to, hard drives, diskettes, CD-ROMs, DVD-ROMs, or other optical or magnetic storage drives.

In a conventional communication network, clients 22, and 24, and clients 26 and 28 via gateway 32 may communicate media, such as voice, video, and data, across networks 20 and 30 during a conference call. Call resources 16 and 18 receive the media from clients 22 and 24, and clients 26 and 28 through gateway 32, mix or process the media to generate mixed signals, and communicate the mixed signals to clients 22 and 24, and clients 26 and 28 through gateway 32 to establish the conference call.

In the illustrated embodiment, media gateway 12 acts as a programmable flow controller for clients 22, 24, 26 and 28, gateway 32 and call resources 16 and 18. In order to establish a conference call, clients 22 and 24, and clients 26 and 28 through gateway 32 communicate media to media gateway 12 over network 20. Media gateway 12 receives the media and may determine how to utilize call resources 16 and 18 based on the availability of call resources 16 and 18, and the number of participants in the conference call. For example, media gateway 12 may determine that call resource 16 is available to conduct the conference call between clients 22, 24, 26 and 28. Media gateway 12 then communicates the media from clients 22, 24, 26 and 28 to call resource 16. Call resource 16 mixes the media and communicates the mixed media to media gateway 12. Media gateway 12 receives the mixed media and communicates the mixed media to clients 22 and 24 over network 20, and to clients 26 and 28 through gateway 32 to establish the conference call. In this example, media gateway 12, rather than call resources 16 and 18, controls communication of media during the conference call.

During use, media gateway 12 also performs allocation of call resources 16 and 18 when multiple conference calls occur over network 20. In a conventional communication network, the media processors in call resources 16 and 18 may conduct one conference call between a maximum number of participants. In the illustrated embodiment, media gateway 12 may allocate call resources 16 and 18 such that the media processors in call resources 16 and 18 may conduct multiple conference calls if the total number of participants in the multiple conference calls is less than or equal to the maximum number of participants.

In one embodiment, the media processors in call resources 16 and 18 may conduct a conference call between a maximum of six participants. Clients 22, 24 and 26 may initiate a first conference call on call resource 16. A media processor in call resource 16 may conduct the conference call since the number of participants is below six. If three or less clients on another network coupled to network 20 initiate a second conference call, media gateway 12 may direct the conference call to the media processor in call resource 16 that is conducting the first conference call. For example, media gateway 12 may direct the second conference call to call resource 16 if the first conference call has been in session for a maximum amount of time, e.g., approximately ten minutes, and there is a low probability of expanding the first conference call. Media gateway 12, therefore, may prevent under-utilization of call resources 16 and 18 by enabling the media processors in call resources 16 and 18 to conduct multiple conference calls.

During a conference call, media gateway 12 may also transfer the conference call between call resources 16 and 18 without notifying clients 22, 24, 26 and 28 that the transfer occurred. For example, call resource 16 may conduct a conference call over network 20 between clients 22, 24, 26 and 28. Media gateway 12 detects a transfer condition, such as a request to add an additional client to the conference call, a request by one of the participating clients to leave the conference call or initiation of a new conference call on call resource 16, and identifies call resource 18 as being available to conduct the conference call. Media gateway 12 duplicates first media from clients 22, 24, 26 and 28 that is being sent to call resource 16 to create second media. Media gateway 12 then communicates the second media to call resource 18. Call resources 16 and 18 respectively mix and process the first and second media, and communicate first and second mixed media to media gateway 12. Media gateway 12 communicates the first mixed media from call resource 16 to clients 22 and 24, and clients 26 and 28 through gateway 32 to maintain the conference call. Media gateway 12 modifies the second mixed media from call resource 18 to match the first mixed media from call resource 16. Once the second mixed media has been modified, media gateway 12 terminates the first media communicated to call resource 16 and the first mixed media communicated to clients 22, 24, 26 and 28. Media gateway 12 then establishes the conference call on call resource 18 by communicating the modified second mixed media to clients 22 and 24, and clients 26 and 28 through gateway 32.

In one embodiment, media gateway 12 receives a request by one of clients 22, 24, 26 and 28 to join the conference call. If call resource 16 is unavailable to conduct the conference call with the additional participant, media gateway 12 transfers the conference call from call resource 16 to call resource 18. Media gateway 12 proceeds to transfer the conference call as described in the above example. In order to mask the transition between call resources 16 and 18, media gateway 12 plays a recorded prompt to users at clients 22, 24, 26 and 28 indicating that a new client has been added to the conference call. Media gateway 12 plays the prompt after it terminates the first mixed media communicated from call resource 16 to clients 22, 24, 26 and 28 but before it communicates the second mixed media from call resource 18 to clients 22, 24, 26 and 28. Any glitches during the transfer, e.g., losing media, may be eliminated or reduced because clients 22, 24, 26 and 28 cannot receive second mixed media from call resource 18 during the prompt.

In another embodiment, media gateway 12 receives a request by one of clients 22, 24, 26 and 28 to leave the conference call. Media gateway 12 determines that call resources 16 and 18 may be utilized more efficiently if the conference call is transferred from call resource 16 to call resource 18. As described above, media gateway 12 transfers the conference call and plays a recorded prompt to users at clients 22, 24, 26 and 28 indicating that a client has left the conference call. Media gateway 12 plays the prompt after it terminates the first mixed media communicated from call resource 16 to clients 22, 24, 26 and 28 but before it communicates the second mixed media from call resource 18 to clients 22, 24, 26 and 28. The prompt masks the handoff between call resources 16 and 18 since no communication between clients 22, 24, 26 and 28 may occur during the prompt.

In a further embodiment, media gateway 12 receives a request to initiate a second conference call on call resource 16. Instead of directing the second conference call to call resource 18, media gateway 12 may transfer the first conference call from call resource 16 to call resource 18. Media gateway 12 transfers the first conference call as described above. Since the number of participants in the first conference call did not change, media gateway 12 transfers the first conference call when it detects a silence period. The users at clients 22, 24, 26 and 28 do not detect the transfer since no media may be exchanged during the silence period.

Figure 2:
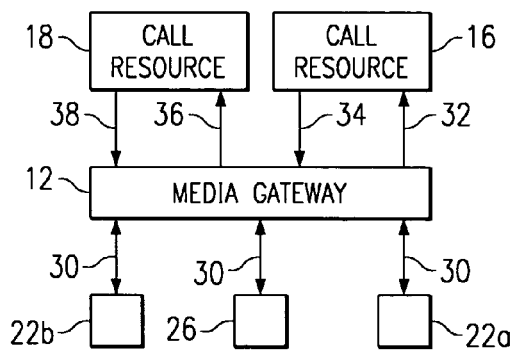
FIG. 2 illustrates a block diagram of communication between a media gateway and the call resources.

FIG. 2 illustrates a block diagram of call resources 16 and 18. Call resources 16 and 18 include media processors 40, controller 42 and network port 44. Network port 44 may communicate with network 20, and may receive media streams from clients 22 and 24, and clients 26 and 28 through gateway 32 and signaling information from call manager 14.

Media processors 40 may exchange and mix media streams communicated from clients 22 and 24, and gateway 32 to media gateway 12 over network 20. Media processors 40 operate with digital signal processing (DSP) resources and perform encoding, transcoding, compressing, decompressing, decoding, mixing, and other signal processing functions to control the conference call. Media processors 40 may receive media streams from media gateway 12, encode, decode, and/or transcode the media streams into a proper format, and generate a number of mixed media streams for communication to clients 22 and 24, and gateway 32 via media gateway 12. The media streams received by media processors 40 and the mixed media streams communicated by media processors 40 are in the form of audio, video or data content encoded in packets, cells, or other portions or segments of information suitable for communication over network 20.

In one embodiment, media processor 40a may receive media streams from clients 22 and 24, and gateway 32 via media gateway 12. Media processor 40a uses suitable signal processing techniques to mix the media streams and produce mixed media streams for communication to clients 22 and 24, and gateway 32 through media gateway 12. Each device participating in the conference call may receive a mixed media stream that includes contribution from all other devices except itself. In this example, client 22 receives a mixed media stream that includes contributions from clients 24, 26 and 28. Similarly, client 28 receives a mixed media stream including contributions from clients 22, 24 and 26.

Controller 42 may provide overall control and management of multiple conference calls conducted using call resources 16 and 18. Specifically, controller 42 may provide administrative control, port assignment, admission control, command generation and receipt, and any other activities to control the conference call and direct media processors 40 to provide the appropriate signal processing. Controller 42 may receive media streams from media gateway 12 and send the media streams to one of media processors 40 conducting the conference call between clients 22, 24, 26 and 28. Controller 42 may also receive signaling information for the conference call from call manager 14.

Figure 3:
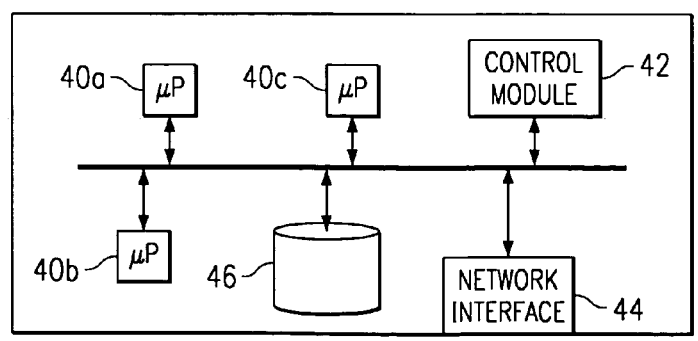
FIG. 3 illustrates a block diagram of a call resource that includes media processors for conducting the conference call.
Figure 6:
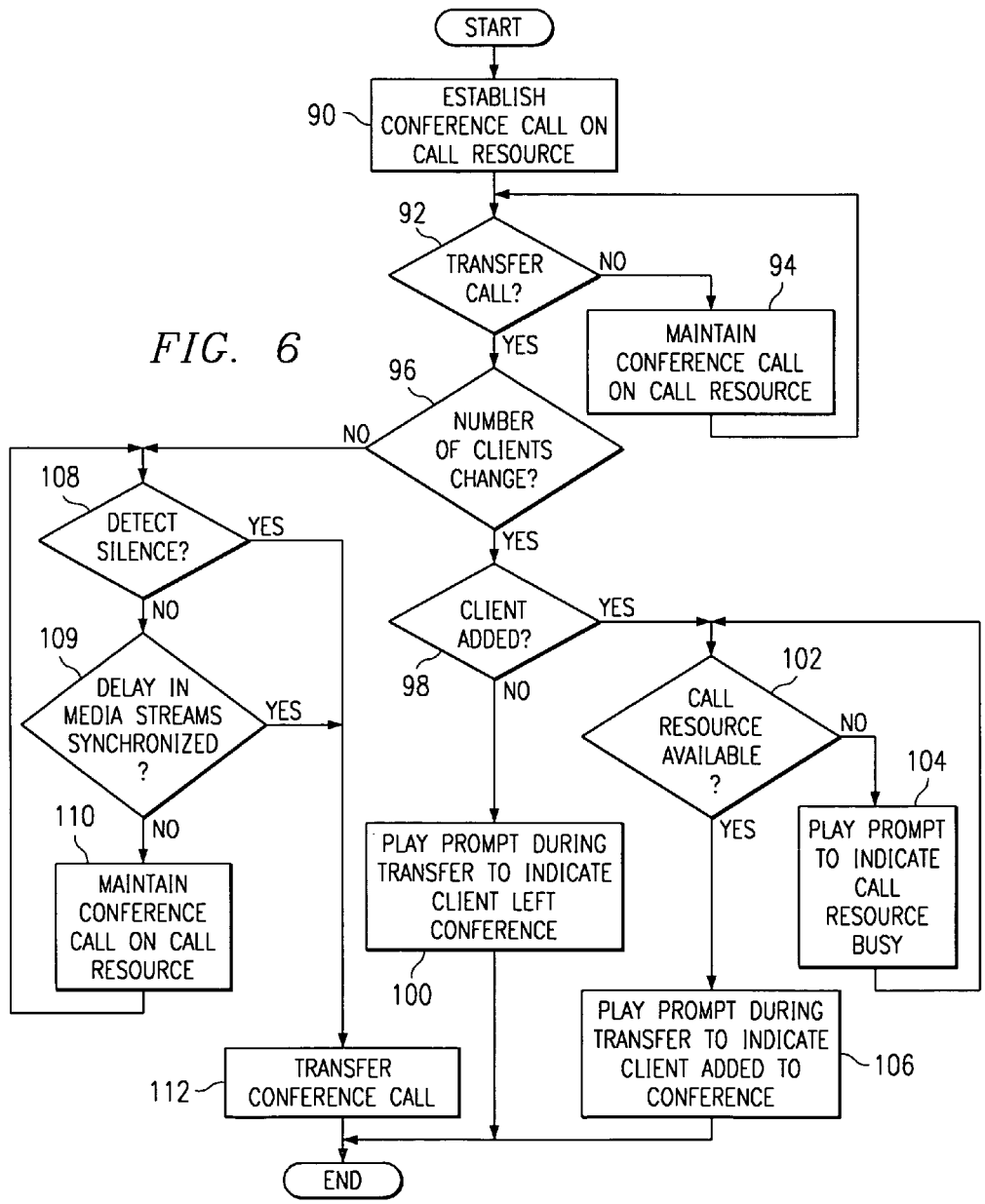
FIG. 6 illustrates a flow diagram of the steps for conducting a transfer of the conference call.

FIG. 3 illustrates a block diagram of media gateway 12 for allocating call resources 16 and 18 during a conference call. Media gateway 12 includes processing module 50, storage medium 52 and network port 54. Storage medium 52 may be any suitable form of a volatile or non-volatile memory that is integral or separate from media gateway 12. Network port 54 may communicate with network 20, and may receive media streams from clients 22 and 24, and clients 26 and 28 through gateway 32 and signaling information from call manager 14. Network port may be a physical port, virtual port, or other suitable direct or indirect connection. Processing module 50 may be a microprocessor, a microcontroller, a digital signal processor (DSP) or any other digital circuitry configured to process information.

In operation, processing module 50 determines if media processors 40 in call resources 16 and 18 are available to conduct a conference call. When processing module 50 receives a request to initiate a conference call, processing module 50 determines what media processors 40 are available in call resources 16 and 18. Once processing module 50 locates an available media processor, processing module 50 communicates the media streams from clients 22 and 24, and clients 26 and 28 through gateway 32 to the available media processor and receives mixed media streams from the media processor for communication to clients 22 and 24, and clients 26 and 28 via gateway 32. The call resource used to conduct the conference call, therefore, is transparent to clients 22, 24, 26 and 28 since clients 22, 24, 26 and 28 communicate directly with media gateway 12.

During use, processing module 50 also allocates media processors 40 in call resources 16 and 18 when multiple conference calls are occurring over network 20. In a conventional communication network, media processors 40 in call resources 16 and 18 may conduct one conference call between a maximum number of participants. In the illustrated embodiment, processing module 50 may allocate call resources 16 and 18 such that media processors 40 may conduct multiple conference calls if the total number of participants in the multiple conference calls is less than or equal to the maximum number of participants.

In one embodiment, media processors 40 in call resources 16 and 18 may conduct a conference call having a maximum of six participants. Clients 22, 24 and 26 may initiate a first conference call on call resource 16. Processing module 50 determines that media processor 40a in call resource 16 may conduct the conference call since the number of participants is below six. If three or less clients on another network coupled to network 20 initiate a second conference call on call resource 16, processing module 50 may direct the conference call to media processor 40a in call resource 16. For example, processing module may determine that media processor 40a in call resource 16 may conduct the second conference call if the first conference call has been in session for a maximum amount of time, e.g., approximately ten minutes, and there is a low probability of expanding the number of participants in the first conference call. Processing module 50, therefore, may provide efficient utilization of media processors 40 in call resources 16 and 18 when multiple conference calls are being conducted over network 20.

During a conference call, processing module 50 may transfer the conference call between media processors 40 in call resources 16 and 18 without suspending communication between clients 22, 24, 26 and 28. In one embodiment, network 20 may be a packet-based network such as an IP network. Network 20 may further support packet switching in which the media streams communicated by clients 22 and 24, and gateway 32 are broken down into packets. The packets may contain a payload (the data to be transmitted), an originator, a destination and synchronization information. In operation, clients 22 and 24, and gateway 32 break the media stream down into packets and transmit the packets over network 20. Each individual packet may be sent along the most optimal route to the destination and packets within the same media stream may not be transmitted over the same path. After call resources 16 and 18 mix the media streams, clients 22 and 24, and gateway 32 receive the mixed media streams containing the packets and reassemble the packets based the synchronization information in each packet. Although the packets may be sent in order, clients 22 and 24, and gateway 32 may receive the packets in a different order and reassemble them in the correct order based on the synchronization information.

In one embodiment, media processor 40a in call resource 16 may conduct a conference call by exchanging packets of voice, video and data information between clients 22 and 24, and clients 26 and 28 through gateway 32. Processing module 50 detects a transfer condition, such as a request to add an additional client to the conference call, a request by one of the participating clients to leave the conference call or initiation of a new conference call on call resource 16, and identifies media processor 40b in call resource 18 to conduct the conference call. Processing module 50 duplicates first packets in a first media stream communicated from media gateway 12 to media processor 40a in call resource 16 to create a second media stream containing second packets. Processing module 50 then communicates the second packets to media processor 40b in call resource 18. Media processor 40a in call resource 16 mixes the first packets and media processor in call resource 18 mixes the second packets. First and second mixed media streams respectively containing first and second mixed packets are communicated to media gateway 12.

Processing module 50 in media gateway 12 stores the synchronization information associated with the first mixed packets in storage medium 52 and communicates the first mixed packets from media processor 40a in call resource 16 to clients 22 and 24, and clients 26 and 28 through gateway 32 to maintain the conference call. Processing module 50 modifies the second mixed packets from media processor 40b in call resource 18 to contain synchronization information stored in storage medium 52. By modifying the second mixed packets to contain the synchronization information from the first mixed packets, clients 22 and 24, and gateway 32 may assemble the second mixed packets in the correct order since the new synchronization information matches the original synchronization information. Once the second mixed packets have been modified, processing module 50 terminates the first mixed packets being communicated to clients 22 and 24, and clients 26 and 28 through gateway 32. Processing module 50 establishes the conference call on media processor 40b in call resource 18 by communicating the modified second mixed packets to clients 22 and 24, and clients 26 and 28 through gateway 32.

In one embodiment, processing module 50 receives a request by one of clients 22, 24, 26 and 28 to join the conference call. If media processors 40 in call resource are unavailable to conduct the conference call with the additional participant, processor 50 may transfer the conference call from media processor 40a in call resource 16 to media processor 40b in call resource 18 as described in the example above. Processing module 50 determines that the conference call may be transferred when at least one second mixed packet has been received from media processor 40b in call resource 18 for each second mixed media stream and modified to contain the synchronization information from at least one first mixed packet from each first mixed media stream.

In order to mask the transition between call resources 16 and 18, processing module 50 may play a recorded prompt to users at clients 22, 24, 26 and 28 indicating the a new client has been added to the conference call. Processing module 50 plays the prompt after it terminates the first mixed media stream communicated from media processor 40a in call resource 16 to clients 22, 24, 26 and 28 but before it communicates the second mixed packets from media processor 40b in call resource 18 to clients 22, 24, 26 and 28. Processing module further adjusts the synchronization information for the modified second mixed packets to compensate for the prompt packets being played out. If processing module 50 did not adjust the synchronization information to compensate for the prompt, audio, video or data would be lost. The addition of the prompt may prevent clients 22, 24, 26 and 28 from dropping any packets during the transfer since clients 22, 24, 26 and 28 may not receive second mixed packets during the prompt.

In another embodiment, processing module 50 receives a request by one of clients 22, 24, 26 and 28 to exit the conference call. Processing module 50 may determine that media processors 40 in call resources 16 and 18 may be utilized more efficiently if the conference call is transferred from media processor 40a in call resource 16 to media processor 40b in call resource 18. As described above, processing module 50 transfers the conference call and plays a recorded prompt to users at clients 22, 24, and 28 indicating that a client has left the conference call. Processing module 50 plays the prompt after it terminates the first mixed media stream communicated from media processor 40a in call resource 16 to clients 22, 24, 26 and 28 but before it communicates the second mixed packets from media processor 40b in call resource 18 to clients 22, 24, 26 and 28. Processing module adjusts the synchronization information for the modified second mixed packets to compensate for the prompt packets being played out. The prompt masks the handoff between media processor 40a in call resource 16 and media processor 40b in call resource 18 since no audio, video or data packets may be communicated by clients 22 and 24, and clients 26 and 28 through gateway 32 during the prompt.

In a further embodiment, processing module 50 may receive a request to initiate a second conference call on media processor 40a in call resource 16. Instead of directing the second conference call to call resource 18, processing module 50 may transfer the first conference call from media processor 40a in call resource 16 to media processor 40b in call resource 18. Processing module 50 determines that the first conference call may be transferred when the modified second mixed packets are the same as the first mixed packets. To make this determination, processing module 50 analyzes and correlates the modified second mixed packets and the first mixed packets. Since the number of participants in the first conference call did not change, processing module 50 transfers the first conference call during a period of silence. The users at clients 22, 24, 26 and 28 do not detect the transfer since no packets may be communicated during the silence period.

Figure 4:
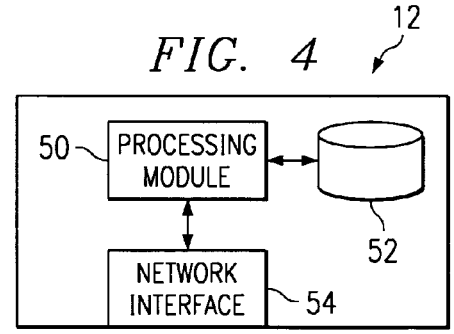
FIG. 4 illustrates a block diagram of a media gateway that allocates call resources during the conference call.

FIG. 4 illustrates a flow diagram of a method for allocating call resources 16 and 18 during a conference call. In one embodiment, network 20 may support communication using the real-time transport protocol (RTP) or any suitable protocol for transporting real-time data, such as audio or video, over network 20. RTP provides end-to-end delivery services for packets of audio, video and data. Each RTP packet within a media stream contains a payload and a header. The payload is the data being transported by the packet and the header that provides a synchronization source (SSRC) number, a sequence number and timing information for that packet. The SSRC number uniquely identifies the source of the packet. All packets from an SSRC form a part of the same timing and sequence number space such that a destination client may group packets by SSRC number for reassembly. The sequence number increments by one for each RTP packet and allows the destination client to reconstruct the source's packet sequence in the proper order. The timestamp indicates when the packet was logically generated.

In step 60, media gateway 12 may establish a conference call on media processor 40a in call resource 16 by communicating RTP packets from clients 22 and 24, and gateway 32. Media processor 40a mixes the RTP packets and communicates mixed RTP packets to clients 22 and 24, and gateway 32 through media gateway 12 to establish the conference call. If media gateway 12 does not receive a signal to transfer the conference call in step 62, media gateway 12 continues to communicate RTP packets from clients 22 and 24, and gateway 32 to media processor 40a in call resource 16 to maintain the conference call in step 64. If media gateway 12 receives a signal to transfer the conference call in step 62, media gateway 12 identifies a media processor on an available call resource in step 66.

In one embodiment, media gateway 12 may determine that media processor 40b in call resource 12 is available to conduct the conference call. In step 68, media gateway 12 duplicates first media streams communicated from clients 22 and 24, and gateway 32 that contain multiple first RTP packets to create a second media stream containing multiple second RTP packets. Media gateway 12 communicates the second media stream to media processor 40b in call resource 18 in step 70 for processing and mixing. Call resource 18 randomly generates SSRC numbers, sequence numbers and timestamps for each second media stream communicated from media gateway 12. Media processor 40a in call resource 16 mixes and processes the first RTP packets associated with the first media streams and media processor 40b in call resource 18 mixes and processes the second RTP packets associated with the second media streams.

In step 72, media gateway 12 simultaneously receives first and second mixed media streams respectively from media processor 40a in call resource 16 and media processor 40b in call resource 18. Since the SSRC numbers, sequence numbers and timestamps associated with the first and second mixed RTP packets are different, media gateway 12 modifies the second mixed RTP packets in step 74 to match the first mixed RTP packets. Media gateway 12 modifies the second mixed RTP packets by removing the SSRC numbers, sequence numbers and timestamps associated with the second mixed media streams and adding the SSRC numbers, sequence numbers and timestamps associated with the first mixed media packets. The second mixed RTP packets in the second mixed media stream are modified so that clients 22 and 24, and gateway 32 continue to receive mixed RTP packets having the same SSRC numbers and sequence numbers. If the second mixed RTP packets were not modified, clients 22 and 24, and gateway 32 may not be able to assemble the packets in the correct order and data may be lost. Furthermore, a large amount of lost data packets may cause clients 22 and 24, and gateway 32 to terminate the conference call.

In step 76, media gateway determines if the modified second mixed media stream may be communicated to clients 22 and 24, and gateway 32. If the information in the modified second mixed RTP packets is not valid, media gateway 12 continues to communicate the first mixed RTP packets associated with the first mixed media streams from media processor 40a in call resource 16 to clients 22 and 24, and gateway 32 in step 78. If the information in the modified second mixed RTP packets is valid, media gateway 12 terminates the first mixed media streams from media processor 40a in call resource 16 in step 80 and communicates the modified second mixed RTP packets associated with the second mixed media streams to clients 22 and 24, and clients 26 and 28 through gateway 32 in step 82. Once clients 22 and 24, and gateway 32 receive the second mixed RTP packets, communication is established with media processor 40b in call resource 18 and media processor 40a in call resource 16 is available to conduct another conference call.

In one embodiment, media gateway 12 determines that the modified second mixed RTP packets contain valid information when at least one second mixed RTP packet has been received and modified for each second mixed media stream communicated by media processor 40b in call resource 18. In an alternative embodiment, media gateway determines that the modified second mixed RTP packets contain valid information when the modified second mixed RTP packets match the first mixed RTP packets. In this case, there may be dissimilar delay between the second mixed RTP packets and the first mixed RTP packets. Media gateway 12 may insert an appropriate delay to equalize the time of arrival of the first and second mixed RTP packets. Media gateway 12 may continue to communicate the first mixed RTP packets to clients 22 and 24, and gateway 32 until a match is obtained. When the delay for the first mixed RTP packets matches the delay for the modified second mixed RTP packets, media gateway 12 terminates the first mixed media streams and communicates the modified second mixed media streams to clients 22 and 24, and gateway 32.

FIG. 5 illustrates a flow diagram of a method for conducting a transfer of a conference call between call resources. In step 90, media gateway 12 may establish the conference call on call resource 16. Media gateway 12 determines in step 92 if the conference call should be transferred to another call resource. If media gateway 12 determines that no transfer is necessary, media gateway 12 continues to conduct the conference call on call resource 16 in step 94 and returns to step 92. If media gateway 12 determines that the conference call should be transferred, media gateway 12 determines if the number of clients participating in the conference call has changed in step 96.

If the number of clients did change, media gateway 12 determines if an additional client joined the conference call in step 98. If one of the participants left the conference call, media gateway 12 plays a recorded prompt to users at clients 22, 24, 26 and 28 during the transfer in step 100. The prompt indicates that one of the participants has left the conference call. If an additional client requested to join the conference call, media gateway 12 determines if call resource 18 is available to conduct the conference call in step 102. If call resource 18 is not available to conduct the conference call, media gateway 12 plays a recorded prompt to a user at the additional client in step 104. The prompt asks the user to make another request to join the conference call because call resources 16 and 18 were unavailable when the first request was made. If call resource 18 is available to conduct the conference call and an additional client has joined the conference call, media gateway 12 plays a recorded prompt to users at clients 22, 24, 26 and 28 in step 106. The prompt indicates that an additional client has joined the conference call.

If the number of clients participating in the conference call did not change, media gateway 12 determines if there is a period of silence in the conference call in step 108. If media gateway 12 has not detected a period of silence, media gateway 12 continues the conference call on call resource 16 in step 110 and returns to step 108. If media gateway 12 detects a period of silence, media gateway 12 transfers the conference call to call resource 18 during the detected period of silence in step 112.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for allocating a plurality of call resources during a conference call, the method comprising:
conducting a conference call between three or more clients using a first media processor, the first media processor conducting the conference call by mixing communications from the three or more clients into a plurality of mixed media streams for distribution to the three or more clients;

detecting a transfer condition;

identifying a second media processor available to conduct the conference call by handling the mixing of the communications from the three or more clients; and in response to detecting the transfer condition, transferring the conference call from the first media processor to the second media processor without suspending communication of the plurality of mixed media streams received by the clients such that the first media processor is no longer handling the conference call.

2. The method of claim 1, wherein the clients are unaware of the transfer of the conference call from the first media processor to the second media processor.

3. The method of claim 1, wherein:

conducting the conference call comprises:

communicating, to the first media processor, a first media stream generated by one of the clients participating in the conference call; and communicating, to the one of the clients, a first mixed media stream received from the first media processor; and transferring the conference call comprises:

duplicating the first media stream to create a second media stream;

communicating the second media stream to the second media processor;

receiving a second mixed media stream from the second media processor;

terminating the first mixed media stream to end communication with the first media processor upon confirming that a modified second mixed media stream is valid; and communicating the modified second mixed media stream to the one of the clients.

4. The method of claim 1, further comprising identifying a transfer condition to indicate a need for transfer of the conference call from the first media processor to the second media processor.

5. The method of claim 4, wherein the transfer condition comprises a request to add one or more additional clients to the conference call.

6. The method of claim 4, wherein the transfer condition comprises a request to drop one or more clients from the conference call.

7. The method of claim 4, wherein the transfer condition comprises receipt of a request to initiate a new conference call using the first media processor.

8. The method of claim 4, wherein identifying the transfer condition to indicate the need for transfer of the conference call from the first media processor to the second media processor further comprises reviewing a current duration of the conference call to indicate the need for transfer of the conference call from the first media processor to the second media processor.

9. A communication system, comprising:

an interface coupled to a communication network and operable to receive media streams communicated by three or more clients participating in a conference call conducted using a first media processor, the first media processor conducting the conference call by mixing communications from the three or more clients into a plurality of mixed media streams for distribution to the three or more clients; and a processing module coupled to the interface, the processing module operable to:

detect a transfer condition;

identify a second media processor available to conduct the conference call by handling the mixing of the communications from the three or more clients; and in response to detecting the transfer condition, transfer the conference call from the first media processor to the second media processor without suspending communication of the plurality of mixed media streams received by the clients such that the first media processor is no longer handling the conference call.

10. The system of claim 9, wherein the clients are unaware of the transfer of the conference call from the first media processor to the second media processor.

11. The system of claim 9, wherein a processing module operable to transfer the conference call from the first media processor to the second media processor comprises a processing module operable to:

duplicate a first media stream generated by one of the clients participating in the conference call to create a second media stream;

communicate the second media stream to the second media processor;

receive a second mixed media stream from the second media processor;

terminate the first mixed media stream to end communication with the first media processor upon confirming that a modified second mixed media stream is valid; and communicating the modified second mixed media stream to the one of the clients.

12. The system of claim 9, wherein the processing module is further operable to identify a transfer condition to indicate a need for transfer of the conference call from the first media processor to the second media processor.

13. The system of claim 12, wherein the transfer condition comprises a request to add one or more additional clients to the conference call.

14. The system of claim 12, wherein the transfer condition comprises a request to drop one or more clients from the conference call.

15. The system of claim 12, wherein the transfer condition comprises receipt of a request to initiate a new conference call using the first media processor.

16. The system of claim 12, wherein the processing module operable to identify the transfer condition to indicate the need for transfer of the conference call from the first media processor to the second media processor is further operable to review a current duration of the conference call to indicate the need for transfer of the conference call from the first media processor to the second media processor.

17. Logic embodied in a computer readable medium, the computer readable medium comprising code that, when executed by a processor, is operable to:

conduct a conference call between three or more clients using a first media processor, the first media processor conducting the conference call by mixing communications from the three or more clients into a plurality of mixed media streams for distribution to the three or more clients;

detect a transfer condition;

identify a second media processor available to conduct the conference call by handling the mixing of the communications from the three or more clients; and in response to detecting the transfer condition, transfer the conference call from the first media processor to the second media processor without suspending communication of the plurality of mixed media streams received by the clients such that the first media processor is no longer handling the conference call.

18. The medium of claim 17, wherein the clients are unaware of the transfer of the conference call from the first media processor to the second media processor.

19. The medium of claim 17, wherein:
code operable to conduct the conference call comprises code operable to:
communicate, to the first media processor, a first media stream generated by one of the clients participating in the conference call; and
communicate, to the one of the clients, a first mixed media stream received from the first media processor; and
code operable to transfer the conference call comprises code operable to:
duplicate the first media stream to create a second media stream;
communicate the second media stream to the second media processor;
receive a second mixed media stream from the second media processor;
terminate the first mixed media stream to end communication with the first media processor upon confirming that a modified second mixed media stream is valid; and
communicate the modified second mixed media stream to the one of the clients.

20. The medium of claim 17, wherein the code is further operable to identify a transfer condition to indicate a need for transfer of the conference call from the first media processor to the second media processor.

21. The medium of claim 20, wherein the transfer condition comprises a request to add one or more additional clients to the conference call.

22. The medium of claim 20, wherein the transfer condition comprises a request to drop one or more clients from the conference call.

23. The medium of claim 20, wherein the transfer condition comprises receipt of a request to initiate a new conference call using the first media processor.

24. The medium of claim 20, wherein code operable to identify the transfer condition to indicate the need for transfer of the conference call from the first media processor to the second media processor comprises code further operable to review a current duration of the conference call to indicate the need for transfer of the conference call from the first media processor-to the second media processor.

25. A system for allocating a plurality of call resources during a conference call, the system comprising:
means for conducting a conference call between three or more clients using a first media processor, the first media processor conducting the conference call by mixing communications from the three or more clients into a plurality of mixed media streams for distribution to the three or more clients;
means for detecting the transfer condition;
means for identifying a second media processor available to conduct the conference call by handling the mixing of the communications from the three or more clients; and
means for, in response to detecting the transfer condition, transferring the conference call from the first media processor to the second media processor without suspending communication of the plurality of mixed media streams received by the clients such that the first media processor is no longer handling the conference call.

26. The system of claim 25, wherein the clients are unaware of the transfer of the conference call from the first media processor to the second media processor.

27. The system of claim 25, wherein:
means for conducting the conference call comprises:
means for communicating, to the first media processor, a first media stream generated by one of the clients participating in the conference call; and
means for communicating, to the one of the clients, a first mixed media stream received from the first media processor; and
means for transferring the conference call comprises:
means for duplicating the first media stream to create a second media stream;
means for communicating the second media stream to the second media processor;
means for receiving a second mixed media stream from the second media processor;
means for terminating the first mixed media stream to end communication with the first media processor upon confirming that a modified second mixed media stream is valid; and
means for communicating the modified second mixed media stream to the one of the clients.

28. The system of claim 25, further comprising means for identifying a transfer condition to indicate a need for transfer of the conference call from the first media processor to the second media processor.

* * * * *